United States Patent
Davis, Jr. et al.

(10) Patent No.: US 9,822,649 B2
(45) Date of Patent: Nov. 21, 2017

(54) INTEGRATED COMBUSTOR AND STAGE 1 NOZZLE IN A GAS TURBINE AND METHOD

(75) Inventors: Lewis Berkley Davis, Jr., Niskayuna, NY (US); Willy Steve Ziminsky, Simpsonville, SC (US); Kevin Weston McMahan, Greer, SC (US); Ronald James Chila, Greer, SC (US); Sergey Anatolievich Meshkov, Moscow (RU)

(73) Assignee: GENERAL ELECTRIC COMPANY, Schenectady, NY (US)

(*) Notice: Subject to any disclaimer, the term of this patent is extended or adjusted under 35 U.S.C. 154(b) by 1587 days.

(21) Appl. No.: 12/269,411

(22) Filed: Nov. 12, 2008

(65) Prior Publication Data

US 2010/0115953 A1    May 13, 2010

(51) Int. Cl.
| | | |
|---|---|---|
| *F01C 1/00* | (2006.01) | |
| *F01D 9/02* | (2006.01) | |
| *F01D 9/04* | (2006.01) | |
| *F23R 3/00* | (2006.01) | |
| *F23R 3/28* | (2006.01) | |
| *F23R 3/46* | (2006.01) | |

(52) U.S. Cl.
CPC .......... *F01D 9/023* (2013.01); *F01D 9/041* (2013.01); *F23R 3/002* (2013.01); *F23R 3/286* (2013.01); *F23R 3/46* (2013.01); *Y02T 50/675* (2013.01)

(58) Field of Classification Search
CPC .......... F01D 9/023; F01D 9/041; F23R 3/002; F23R 3/286; F23R 3/46
USPC .................. 60/737, 740, 746, 752, 776
See application file for complete search history.

(56) References Cited

U.S. PATENT DOCUMENTS

| | | | |
|---|---|---|---|
| 3,018,624 A | | 1/1962 | Bonsall et al. |
| 4,023,919 A | * | 5/1977 | Patterson ............... 415/134 |
| 4,409,787 A | | 10/1983 | Davi et al. |
| 4,432,207 A | | 2/1984 | Davis, Jr. et al. |
| 4,445,339 A | | 5/1984 | Davis, Jr. et al. |
| 4,719,748 A | | 1/1988 | Davis, Jr. et al. |
| 4,928,481 A | * | 5/1990 | Joshi et al. ............. 60/737 |
| 5,000,004 A | * | 3/1991 | Yamanaka et al. ........ 60/723 |
| 5,203,796 A | | 4/1993 | Washam et al. |
| 5,289,677 A | * | 3/1994 | Jarrell ................. 60/796 |

(Continued)

FOREIGN PATENT DOCUMENTS

| | | |
|---|---|---|
| CN | 1188210 A | 7/1998 |
| CN | 1401938 A | 3/2003 |

(Continued)

OTHER PUBLICATIONS

Office Action and Search Report from CN Application No. 200910226044.5 dated May 30, 2013.

(Continued)

*Primary Examiner* — Gerald L Sung
(74) *Attorney, Agent, or Firm* — Nixon & Vanderhye P.C.

(57) ABSTRACT

An integrated combustor and stage one nozzle in a gas turbine includes a combustion chamber that receives premixed fuel and air from at least one fuel nozzle group at separate axial locations. The combustion chamber includes a liner and a transition piece that deliver hot combustion gas to the turbine. The stage one nozzle, the liner and the transition piece are integrated into a single part. At least one of the axial locations of the one or more fuel nozzle groups includes a plurality of small scale mixing devices that concentrate heat release and reduce flame length.

11 Claims, 5 Drawing Sheets

(56) References Cited

U.S. PATENT DOCUMENTS

| | | | |
|---|---|---|---|
| 5,491,970 A | 2/1996 | Davis, Jr. et al. | |
| 5,749,219 A * | 5/1998 | DuBell | 60/804 |
| 5,749,701 A | 5/1998 | Clarke et al. | |
| 6,089,025 A | 7/2000 | Tekriwal et al. | |
| 6,220,815 B1 | 4/2001 | Rainous et al. | |
| 6,250,063 B1 | 6/2001 | Davis, Jr. et al. | |
| 6,415,608 B1 * | 7/2002 | Newburry | 60/723 |
| 6,633,623 B2 | 10/2003 | Dulka et al. | |
| 6,680,549 B2 | 1/2004 | Boardman et al. | |
| 6,840,048 B2 * | 1/2005 | Han et al. | 60/772 |
| 6,882,068 B2 | 4/2005 | Weeber et al. | |
| 6,928,823 B2 * | 8/2005 | Inoue et al. | 60/776 |
| 6,979,118 B1 | 12/2005 | Mick et al. | |
| 6,993,916 B2 | 2/2006 | Johnson et al. | |
| 7,082,766 B1 | 8/2006 | Widener et al. | |
| 7,181,916 B2 | 2/2007 | Ziminsky et al. | |
| 7,185,494 B2 | 3/2007 | Ziminsky et al. | |
| 7,210,297 B2 | 5/2007 | Shah et al. | |
| 7,278,266 B2 | 10/2007 | Taware et al. | |
| 7,320,213 B2 | 1/2008 | Shah et al. | |
| 7,337,057 B2 | 2/2008 | Norman et al. | |
| 7,441,398 B2 | 10/2008 | Ziminsky et al. | |
| 7,490,471 B2 | 2/2009 | Lynch et al. | |
| 7,665,309 B2 * | 2/2010 | Parker et al. | 60/776 |
| 2004/0088990 A1 | 5/2004 | Little et al. | |
| 2008/0264033 A1 * | 10/2008 | Lacy et al. | 60/39.49 |
| 2009/0071159 A1 * | 3/2009 | Parker et al. | 60/747 |

FOREIGN PATENT DOCUMENTS

| | | |
|---|---|---|
| CN | 1549886 A | 11/2004 |
| CN | 101285591 A | 10/2008 |
| EP | 1903184 A2 | 3/2008 |
| EP | 1985927 A2 | 10/2008 |
| GB | 2445565 A2 | 7/2008 |
| JP | 2008111652 A | 5/2008 |
| JP | 2008157478 A | 7/2008 |

OTHER PUBLICATIONS

Unofficial English translation of Office Action issued in connection with corresponding JP Application No. 2009-251575 dated Sep. 17, 2013.

Tacina, Robert et al., "Experimental Sector and Flame-Tube Evaluations of a Multipoint Integrated Module Concept for Low Emission Combustors", Proceedings of ASME Turbo Expo 2004, GT2004-53263, pp. 1-13, Jun. 14, 2004.

* cited by examiner

INTEGRATED COMBUSTOR AND STAGE 1 NOZZLE IN A GAS TURBINE AND METHOD

BACKGROUND OF THE INVENTION

The invention relates to gas turbine combustors and, more particularly, an integrated combustor and stage 1 nozzle for a gas turbine.

Gas turbine engines typically include a compressor section, a combustor section, and at least one turbine section. The compressor compresses air that is mixed with fuel and channeled to the combustor. The mixture is then ignited generating hot combustion gases. The combustion gases are channeled to the turbine, which extracts energy from the combustion gases for powering the compressor, as well as for producing useful work to power a load, such as an electrical generator.

Typically, the combustion section is distinct and separate from the downstream turbine. In particular, for can-annular designs, these two components—combustor and turbine—meet at the interface of the combustion transition piece and the turbine first stage nozzle. This interface requires the use of seals to minimize leakages into the gas path. These leakages impact the emissions capability (i.e., NOx) of the combustor since large leakages will result in elevated combustion temperatures for the same turbine inlet temperature. It would thus be desirable to eliminate the seals and reduce the number of parts by integrating the first stage nozzle into the transition piece design.

The transition piece length—and overall combustor length—is driven by the time required for complete combustion (in particular at part power settings). This length is conventionally too long to practically combine the transition piece with the stage 1 nozzle (both from a manufacturing perspective and from the standpoint of accommodating the relative motion of the turbine/combustor interfaces). As such, in order to integrate the first stage nozzle into the transition piece design, it would be desirable to reduce the combustor length.

BRIEF DESCRIPTION OF THE INVENTION

In an exemplary embodiment, an integrated combustor and stage one nozzle in a gas turbine include a combustion chamber that receives premixed fuel and air from at least one fuel nozzle group at separate axial locations. The combustion chamber includes a liner and a transition piece that deliver hot combustion gas to the turbine. The stage one nozzle, the liner and the transition piece are integrated into a single part. At least one of the axial locations of the one or more fuel nozzle groups includes a plurality of small scale mixing devices that concentrate heat release and reduce flame length.

In another exemplary embodiment, the integrated combustor and stage one nozzle includes a combustion chamber that receives premixed fuel and air from at least one fuel nozzle group at separate axial locations. The combustion chamber includes a liner and a transition piece that deliver hot combustion gas to the turbine. At least one of the axial locations of the one or more fuel nozzle groups includes a plurality of small scale mixing devices that concentrate heat release and reduce flame length. The reduced flame length enables the stage one nozzle, the liner and the transition piece to be integrated into a single part.

In yet another exemplary embodiment, a method of integrating a combustor and a stage one nozzle in a gas turbine includes the steps of arranging a combustion chamber to receive premixed fuel and air from at least one fuel nozzle group at separate axial locations, wherein the combustion chamber includes a liner and a transition piece that deliver hot combustion gas to the turbine; providing at least one of the axial locations of the one or more fuel nozzle groups with a plurality of small scale mixing devices that concentrate heat release and reduce flame length; and integrating the stage one nozzle, the liner and the transition piece into a single part by virtue of the reduced flame length.

DETAILED DESCRIPTION OF THE INVENTION

Figure 1:
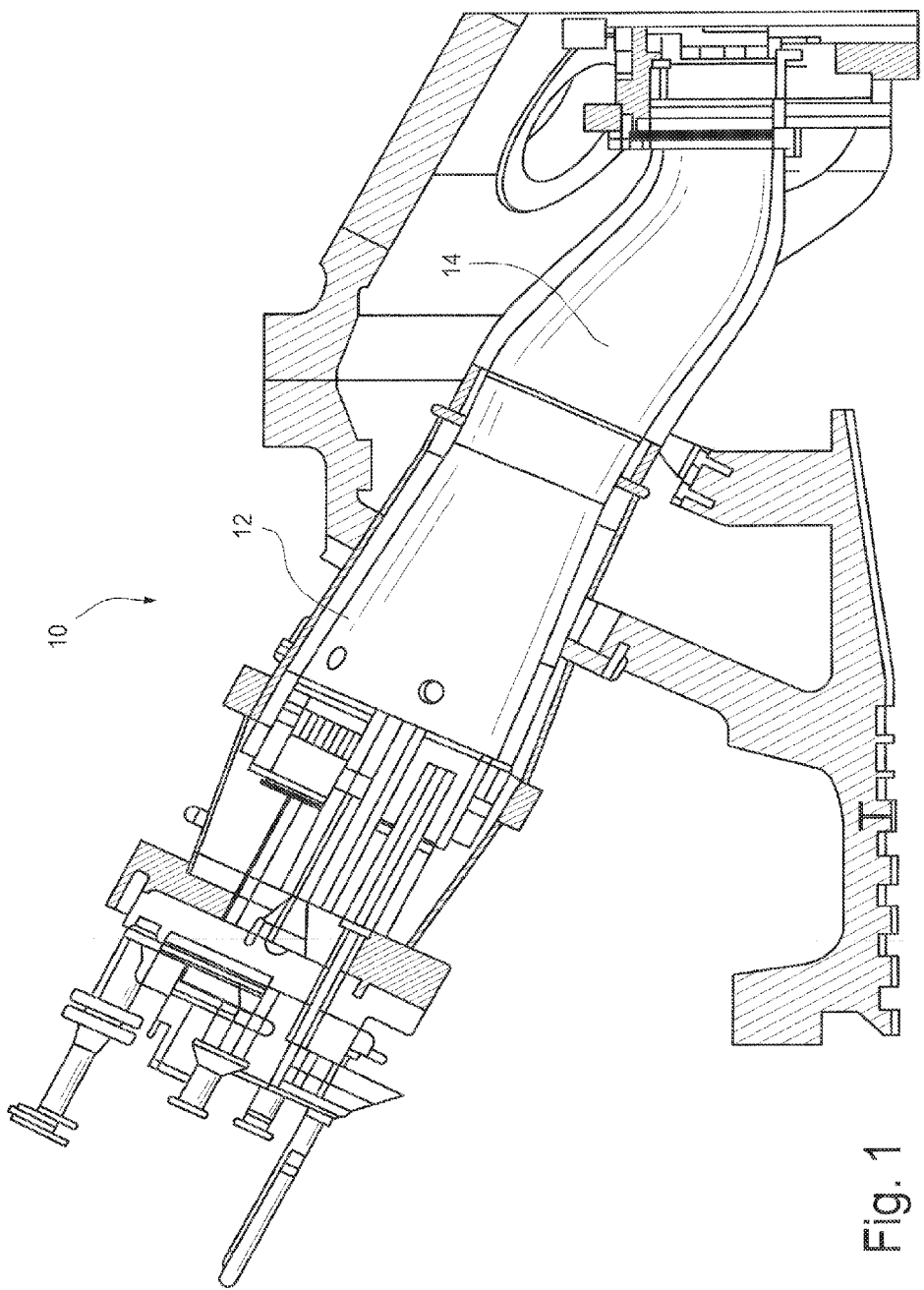
FIG. 1 is a cross section view of a conventional "long" combustor.

FIG. 1 illustrates a prior art combustor for a gas turbine, which includes a compressor, a plurality of combustors, and a turbine. Although not specifically shown, the turbine is drivingly connected to the compressor along a common axis. The compressor pressurizes inlet air, which is then reverse flowed to the combustor where it is used to cool the combustor and to provide air to the combustion process. The combustor 10 includes a liner 12 that defines a combustion zone and a transition piece 14 that connects the outlet end of the combustor with an inlet end of the turbine to deliver the hot products of combustion to the turbine. As noted, the interface between the combustion transition piece 14 and the turbine first stage nozzle requires the use of seals to minimize leakages into the gas path. In the described embodiments, it is proposed to integrate the stage 1 nozzle into the transition piece design.

Figure 2:
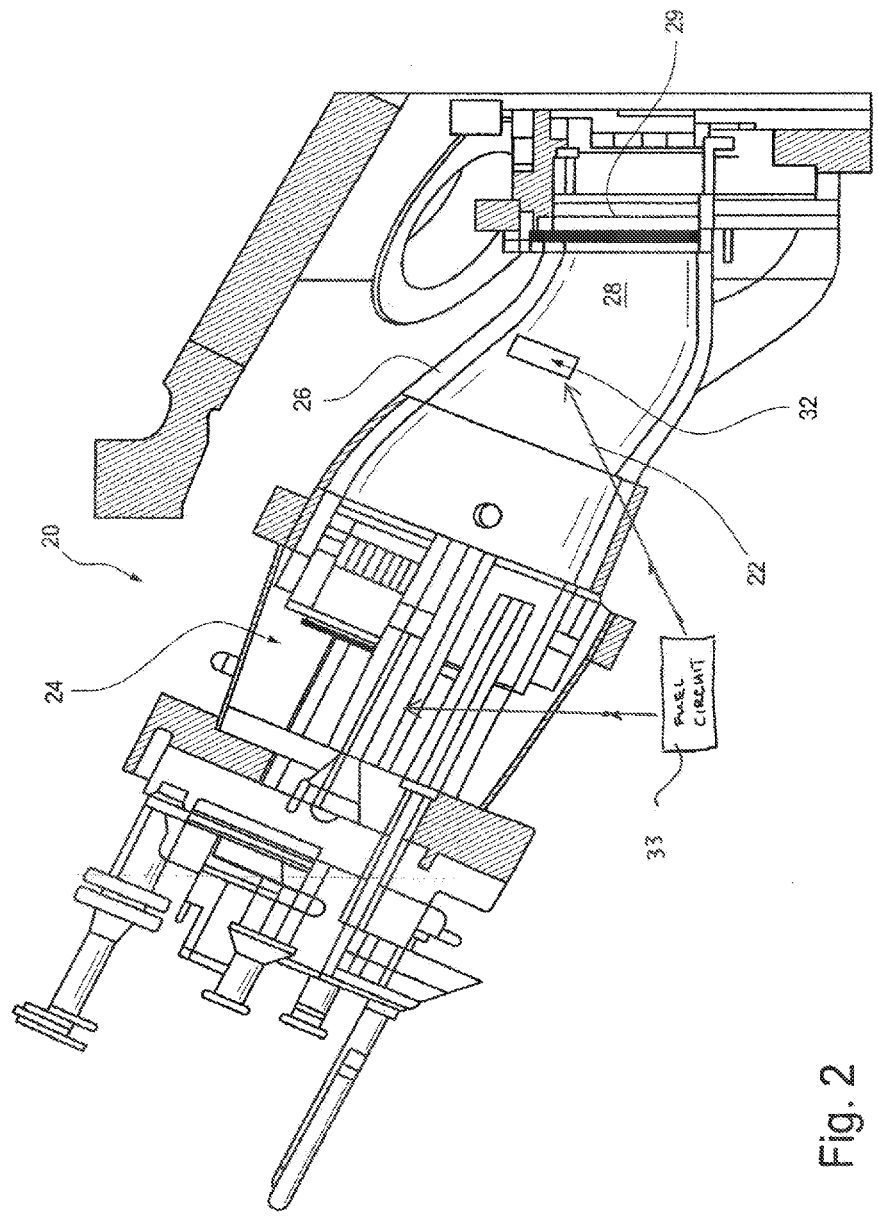
FIG. 2 is a cross-sectional view of a "compact" integrated combustor of the described embodiments.
Figure 6:
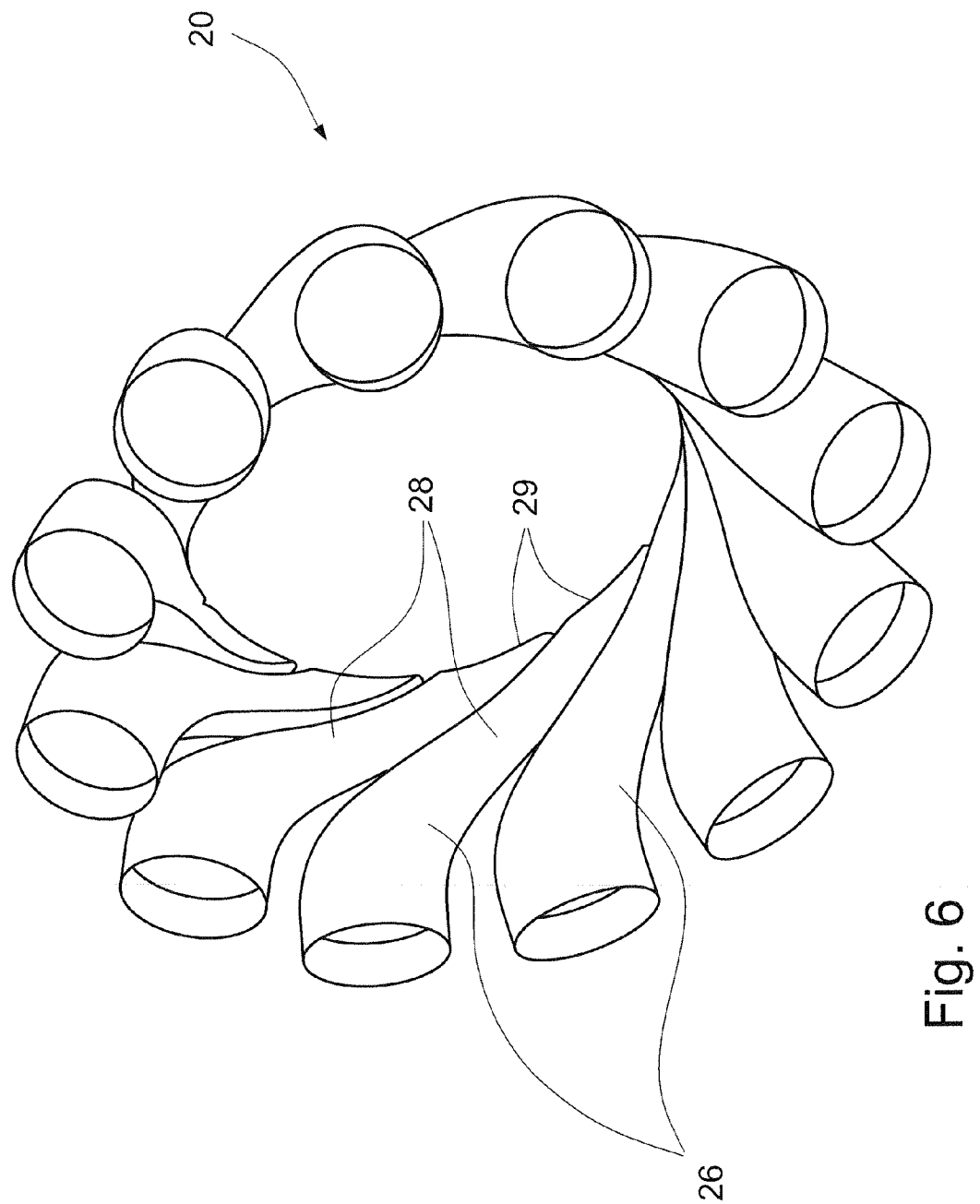
FIG. 6 is a perspective view of the integrated combustor and stage 1 nozzle.

FIG. 2 is a cross-sectional view of the integrated combustor and stage 1 nozzle 20. The structure includes a combustion chamber 22 receiving premixed fuel and air from at least one fuel nozzle group 24 at separate axial locations. The combustion chamber 22 includes a combustion liner 26 and a transition piece 28 that deliver hot combustion gas to the turbine via a stage 1 nozzle 29. As shown in FIG. 2, the stage 1 nozzle 29, the liner 26 and the transition piece 28 are integrated into a single part. FIG. 6 is a perspective view of the assembly.

Figure 3:
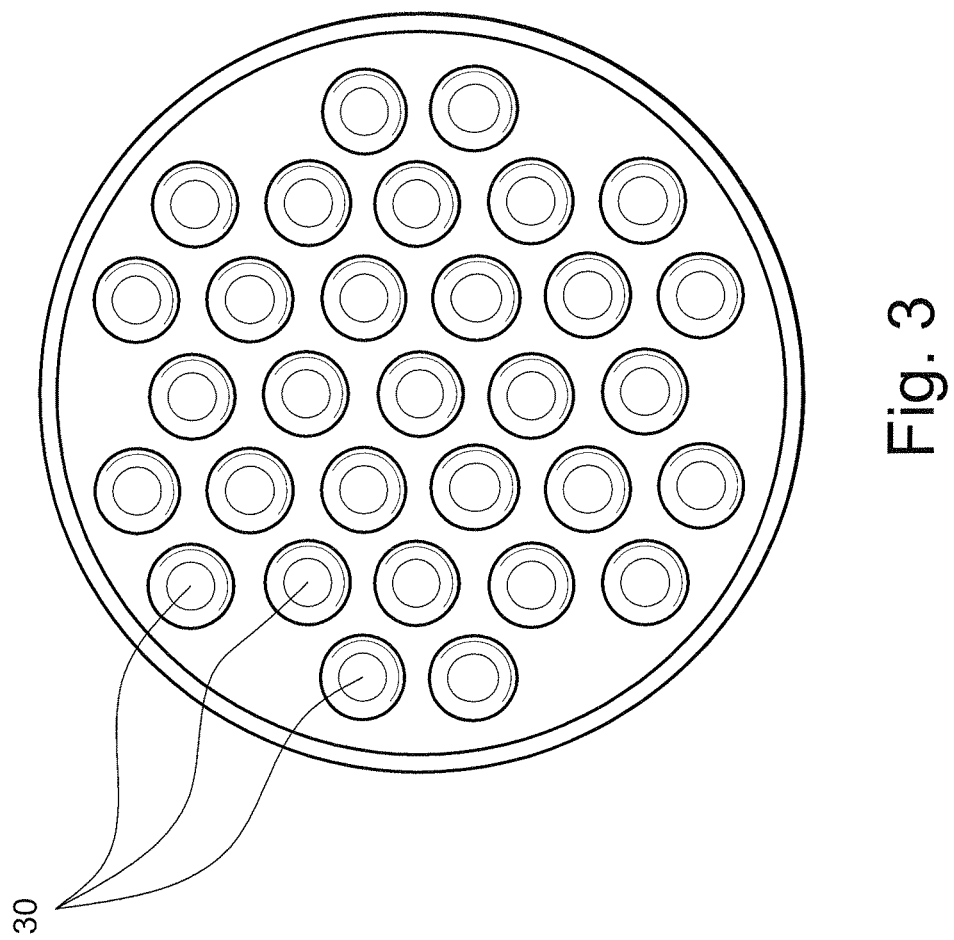
FIG. 3 is a close-up view of small mixer rapid-mix nozzles that deliver premixed fuel and air in the combustor.

FIG. 3 is a close-up view of small mixer rapid-mix nozzles provided at least one of the axial locations of the one or more fuel nozzle groups 24. The small scale mixing devices 30 serve to concentrate the heat release and reduce the characteristic flame length. As shown, the axial location includes thirty-one rapid-mix nozzles, although the invention is not meant to be limited to the illustrated structure. The mixing elements 30 preferably have a length scale on the order of $\frac{1}{10}$ to $\frac{1}{100}$ of the liner diameter, as compared with the conventional design employing mixing nozzles with a length scale on the order of $\frac{1}{3}$ of the liner diameter (or liner height for annular designs). The concentrated heat release and reduction in characteristic flame length provided by the small scale mixing devices 30 enable the stage 1 nozzle, the liner and the transition piece to be integrated into a single part, thereby forming a "compact" combustor shown in FIG. 2 as compared with the prior art "long" combustor shown in FIG. 1.

The mixing elements 30 can be arrayed in a single plane as with many modern designs or in multiple axial locations. Regardless of the axial placement, the combustors are organized so as to have fuel control at the individual combustor level for each axial location. This level of local fuel control serves to minimize the variation that degrades the performance of modern designs. In one embodiment, a second stage fuel injector 32 is disposed in the transition piece 28. In this context, the fuel control comprises a fuel circuit 33 that controllably divides fuel flow between the first stage fuel injector(s) and the second stage fuel injector(s). Fuel control at the individual combustor level is presented in opposition to the current predominant practice of fuel control at the arrangement level. That is, in most can-annular combustor arrangements, the fuel will be controlled via a manifold that connects all the cans to one control valve. In contrast, with control at the can level, each chamber has its own control valve. Thus, non-uniformity inherent in the manifold piping or airflow distribution around the gas turbine can be canceled out by adjusting the fuel flow to each combustor can so that a uniform fuel to air ratio to all combustor cans can be achieved. The ability to drive out variation through local fuel control eliminates any additional length that might be required to assemble a multi-chamber array. This fuel control, combined with the compact heat release provided by the small scale mixing devices 30 better enables the liner, transition piece and stage 1 nozzle to be integrated into the single part.

Figure 5:
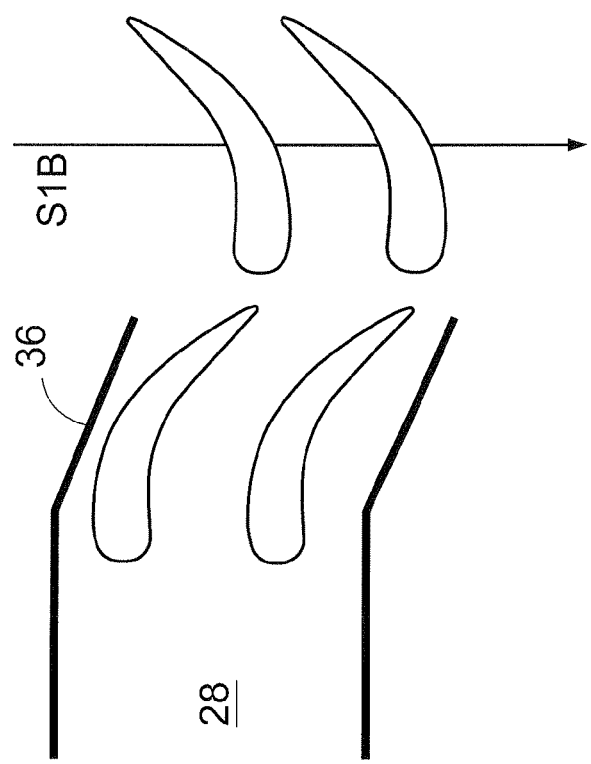
FIGS. 4 and 5 show alternative embodiments of the interface between the integrated combustor and stage 1 nozzle and the stage 1 turbine bucket.
Figure 4:
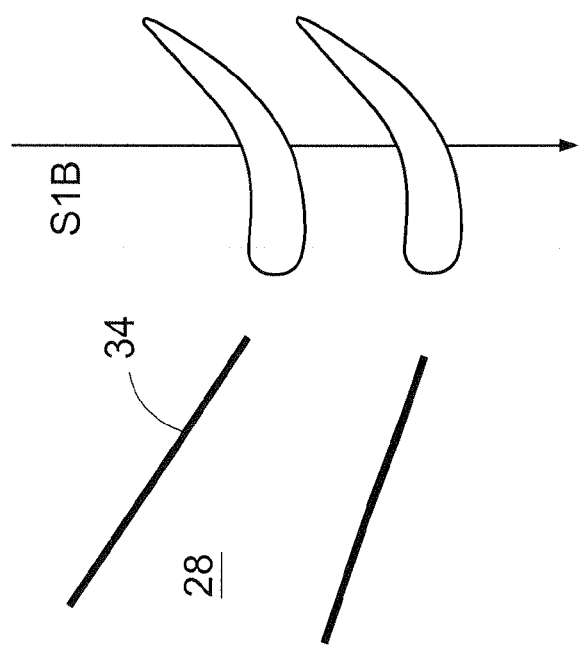

FIGS. 4 and 5 illustrate alternative embodiments for the integrated structure. In FIG. 4, the transition piece 28 comprises a choked end 34 that directs flow of the hot combustion gas at a suitable angle toward the stage 1 turbine bucket (S1B). In this embodiment, the choked end 34 of the transition piece serves as the stage 1 nozzle. In FIG. 5, the transition piece 28 includes an extended shroud 36 disposed surrounding the stage 1 nozzle, where the extended shroud and the stage 1 nozzle direct the flow of the hot combustion gas at a suitable angle toward the stage 1 turbine bucket S1B.

The embodiments described herein integrate the combustor with the turbine by reducing the combustor length. Combustor length is reduced by concentrating the heat release and reducing chamber-to-chamber variation. The integrated structure allows for a reduction in the number of parts required to complete the heat addition and flow throttling for the gas turbine design. A reduced part count also will reduce costs and outage time.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An integrated can-annular combustor and stage one nozzle in a gas turbine, comprising a liner, a transition piece, and a stage one nozzle integrated as a single part, wherein the liner and the transition piece define a combustion chamber, the combustion chamber receiving premixed fuel and air from at least one fuel nozzle group operatively associated with the liner to produce hot combustion gas, and wherein the hot combustion gas is delivered from the liner through the transition piece and stage one nozzle to the turbine, one of the one or more fuel nozzle groups including a plurality of mixing nozzles that premix fuel and air and concentrate heat release and reduce flame length.

2. An integrated can-annular combustor and stage one nozzle according to claim 1, wherein the mixing nozzles are arranged in one of a single plane or a plurality of axial locations and include fuel control for each axial location.

3. An integrated can-annular combustor and stage one nozzle according to claim 2, further comprising at least one first stage fuel injector cooperable with the at least one fuel nozzle group and a second stage fuel injector disposed in the transition piece, wherein the fuel control comprises a fuel circuit that controllably divides fuel flow between the at least one first stage fuel injector and the second stage fuel injector.

4. An integrated can-annular combustor and stage one nozzle according to claim 1, wherein the mixing nozzles have a length of $\frac{1}{10}$ to $\frac{1}{10}$ of a liner diameter.

5. An integrated can-annular combustor and stage one nozzle according to claim 1, wherein the mixing nozzles are arranged in an array in a single plane.

6. An integrated can-annular combustor and stage one nozzle according to claim 1, wherein the mixing nozzles are arranged in an array in a plurality of axial locations.

7. An integrated can-annular combustor and stage one nozzle according to claim 1, wherein the gas turbine includes a stage one turbine bucket disposed adjacent the single part, and wherein the transition piece comprises a choked end that directs flow of the hot combustion gas at a suitable angle toward the stage one turbine bucket.

8. An integrated can-annular combustor and stage one nozzle according to claim 7, wherein the choked end of the transition piece serves as the stage one nozzle.

9. An integrated can-annular combustor and stage one nozzle according to claim 1, wherein the gas turbine includes a stage one turbine bucket disposed adjacent the single part, and wherein the transition piece comprises an extended shroud disposed surrounding the stage one nozzle, the extended shroud and the stage one nozzle directing flow of the hot combustion gas at a suitable angle toward the stage one turbine bucket.

10. An integrated can-annular combustor and stage one nozzle in a gas turbine, comprising a liner, a transition piece, and a stage one nozzle, wherein the liner and the transition piece define a combustion chamber, the combustion chamber receiving premixed fuel and air from at least one fuel nozzle group operatively associated with the liner to produce hot combustion gas, and wherein the hot combustion gas is delivered from the liner through the transition piece and stage one nozzle to the turbine, one of the one or more fuel nozzle groups including a plurality of mixing nozzles that premix fuel and air and concentrate heat release and reduce flame length, and wherein the reduced flame length enables the stage one nozzle, the liner and the transition piece to be integrated into a single part.

11. A method of integrating a can-annular combustor and a stage one nozzle in a gas turbine, the method comprising:
   arranging a combustion chamber to receive premixed fuel and air from at least one fuel nozzle group, wherein the combustion chamber includes a liner and a transition piece that deliver hot combustion gas to the turbine;
   providing one of the one or more fuel nozzle groups with a plurality of mixing nozzles that premix fuel and air and concentrate heat release and reduce flame length; and integrating the stage one nozzle, the liner and the transition piece into a single part by virtue of the reduced flame length,
wherein the mixing nozzles have a length of 1/10 to 1/100 of a liner diameter.

* * * * *

UNITED STATES PATENT AND TRADEMARK OFFICE
CERTIFICATE OF CORRECTION

PATENT NO. : 9,822,649 B2
APPLICATION NO. : 12/269411
DATED : November 21, 2017
INVENTOR(S) : Davis, Jr. et al.

It is certified that error appears in the above-identified patent and that said Letters Patent is hereby corrected as shown below:

In the Specification

Column 2, Line 55, change "provided at least one" to --provided at at least one--

In the Claims

Claim 4, Column 4, Line 19, change "to 1/10" to --to 1/100--

Signed and Sealed this
Twenty-seventh Day of March, 2018

Andrei Iancu
*Director of the United States Patent and Trademark Office*